(12) United States Patent
Ashwin

(10) Patent No.: US 6,232,877 B1
(45) Date of Patent: May 15, 2001

(54) SECURITY SYSTEM

(75) Inventor: Terrence Keith Ashwin, Randpark Ridge (ZA)

(73) Assignee: Konisa Limited, Douglas (GB)

( * ) Notice: Subject to any disclaimer, the term of this patent is extended or adjusted under 35 U.S.C. 154(b) by 0 days.

(21) Appl. No.: 09/260,284

(22) Filed: Mar. 2, 1999

(30) Foreign Application Priority Data

Mar. 2, 1998 (ZA) ................................... 98/1722

(51) Int. Cl.⁷ ................................................ G08B 13/14
(52) U.S. Cl. ............................... 340/572.1; 340/572.3; 340/572.4; 340/571; 340/568.1; 340/825.34; 340/539; 235/384; 705/28
(58) Field of Search ........................ 340/572.1, 571, 340/539, 573.3, 573.4, 568.1, 686.6, 825.34; 235/384; 705/28

(56) References Cited

U.S. PATENT DOCUMENTS

| | | | |
|---|---|---|---|
| 5,051,565 | * 9/1991 | Wolfram | 235/384 |
| 5,272,318 | 12/1993 | Gorman | 235/375 |
| 5,396,218 | 3/1995 | Olah | 340/572 |
| 5,583,486 | 12/1996 | Kersten | 340/568 |
| 5,774,876 | * 6/1998 | Woolley et al. | 705/28 |
| 5,886,634 | * 3/1999 | Muhme | 340/572.1 |
| 6,111,506 | * 8/2000 | Yap et al. | 340/572.1 |

FOREIGN PATENT DOCUMENTS

| | | |
|---|---|---|
| 0357309 | 3/1990 | (EP) . |
| 2248331 | 4/1992 | (GB) . |

* cited by examiner

*Primary Examiner*—Benjamin C. Lee
(74) *Attorney, Agent, or Firm*—Ladas & Parry

(57) ABSTRACT

A monitoring system 10 is provided which includes a primary electronic tag 12, a secondary electronic tag 16, reading apparatus 20, and a comparator 26. The primary electronic tag 12 includes primary identification data associated with the primary bearer 14 of the tag 12 and the secondary electronic tag 16 includes secondary identification data. The secondary identification data is associated with a secondary bearer 18 of the tag 16 and is also associated with the primary identification data. The reading apparatus 20 remotely reads the primary and secondary identification data and the comparator 26 compares the data and generates an output signal dependent upon the outcome of the comparison. The invention extends to a primary electronic tag 12 for use in monitoring movement of at least one secondary electronic tag 16. The invention also extends to a method of monitoring movement from a selected zone and a method of monitoring the use of at least one vehicle.

21 Claims, 2 Drawing Sheets

SECURITY SYSTEM

This invention relates to a monitoring system. It also relates to a method of monitoring movement from a selected zone. Further, it relates to a method of monitoring the use of at least one vehicle and to a primary electronic tag.

Identification tags such as electronic tags, e.g. transponder tags, are commonly available in the market place. Such tags are often carried by employees to control access to and from a building. Such employees may however be of devious intent and, upon departing, selected objects, e.g. valuable goods such as laptop computers or the like, may be stolen. It is an object, inter alia, of this invention to offer a solution to this problem.

In accordance with the invention, there is provided a monitoring system which includes a primary electronic tag including primary identification data and associated with a primary bearer of the tag;

a secondary electronic tag including secondary identification data and associated with a secondary bearer of the tag, the secondary identification data being associated with the primary identification data;

reading apparatus for remotely reading the primary identification data from the primary identification tag and remotely reading the secondary identification data from secondary identification tag; and comparator means operable to compare the secondary identification data and the primary identification data and generate an output signal dependent upon an outcome of the comparison.

Typically the system includes a plurality of secondary electronic tags associated with the primary electronic tag, each secondary electronic tag including secondary identification data which identifies the secondary bearer to which it is attached and which is identified by the primary identification data.

In certain embodiments of the invention, the primary electronic tag is carried in use by a person and the secondary electronic tag includes secondary attachment means configured fixedly to attach it to the secondary bearer in the form an item of value e.g. a laptop computer or the like.

The primary identification data may include an inventory of valuable items which the bearer is authorised to remove from a particular zone, each item including a secondary electronic tag which is identified by the primary identification data.

The system may include alarm apparatus responsive to the output signal for generating an alarm signal when the bearer of the primary electronic tag is not authorised to remove the valuable item from the zone. The system may include a security control arrangement, e.g. a turn-style or the like, responsive to the control signal and operable selectively to inhibit departure of the person from the zone if the valuable item is not included in the inventory. The access control arrangement is typically operable to allow access when selected identification data included in the primary and secondary identification data match.

The primary electronic tag may be a conventional electronic tag, e.g. a transponder tag, an active electronic tag including a transmitter only, or the like.

The primary identification data of the primary electronic tag may include identification data which identifies the authorised person, e.g. the person's name or the like. Accordingly, the electronic tag may have storage means for storing the primary identification data on the tag.

The secondary electronic tag may also be a conventional electronic tag. The secondary electronic tag typically includes storage means to store the secondary identification data and, optionally, the primary identification data.

Typically, the system comprises a plurality of secondary electronic tags, each tag including secondary identification data which identifies an object to which it is uniquely associated. Accordingly, for example, any one of a variety of goods may be associated with the authorised person. The system may include alarm means for generating an alarm signal when the person is not authorised to remove the object.

Typically, the primary electronic tag includes a plurality of secondary identification data, each item of secondary identification data being uniquely associated with a secondary electronic tag uniquely associated with a particular object to which the tag is associated, typically, securely attached thereto. Thus, the primary identification data may define a so-called "asset list" or "object list" which the bearer of the primary electronic tag may, for example, be authorised to remove from the selected zone, typically business premises, via an access control point.

In certain embodiments of the invention, the primary electronic tag includes primary attachment means configured releasably to attach it to the primary bearer which is in the form of a person and the secondary electronic tag includes secondary attachment means configured releasably to attach it to the secondary bearer which is also in the in the form a person.

The secondary identification data may identify a child under the supervision of the bearer of the primary electronic tag and the comparator may generate an output signal in the form of an alarm signal when the primary and secondary electronic tags are not within a predetermined zone covered by the reading apparatus.

The system may include a plurality of reading apparatus each covering a different predetermined zone forming part of a public area e.g. a theme park such as Disney World™ or the like. The comparator may operable to process the primary identification data and verify that all secondary electronic tags identified by the primary identification data are located within the predetermined zone covered by associated reading apparatus failing which an output signal in the form of an alarm signal is generated.

In other embodiments of the invention, the primary electronic tag is issued in use to a person authorised to use at least one selected vehicle and the secondary electronic tag is uniquely associated with and attached in use to the selected vehicle, the output signal indicating if the person is authorised to use the vehicle. Accordingly, the system may include disabling means responsive to the output signal and connected in use to an electrical system of the vehicle and operable selectively to disable the vehicle. The disabling means may be a conventional vehicle disabling arrangement for disabling the vehicle when the secondary and primary identification do not match.

Typically, the secondary electronic tag is located in a fuel tank of the vehicle.

The primary and secondary electronic tags may be active tags including an RF transmitter for intermittently transmitting the identification data.

The primary and secondary electronic tags may be programmed with the primary and secondary identification data in a wireless fashion.

The secondary and/or primary electronic tags may include tamper detection means for detecting tampering with the tag e.g. an attempt to remove it from the bearer.

The primary electronic tag may be a portable tag which may be, for example, attached to clothing or the like of the person, located in a pocket of the authorised person, or the like. The primary electronic tag may be arranged to performs similar functions as a conventional tag, e.g. time reporting or the like.

Still further in accordance with the invention, there is provided a primary electronic tag for use in monitoring movement of at least one secondary electronic tag, the primary electronic tag including primary identification data programmed to identify a bearer of the primary electronic tag in use and identify the secondary electronic tag.

The primary identification data may include an inventory of a plurality of secondary electronic tags associated with the primary electronic tag. The primary electronic tag may include a transmitter for intermittently transmitting a signal including the primary identification data to reading apparatus.

Further in accordance with the invention, there is provided a method of monitoring movement from a selected zone, the method including reading primary identification data from a primary electronic tag issued to a primary bearer of the primary electronic tag;

reading secondary identification data from a secondary electronic tag associated with a secondary bearer of the secondary electronic tag, the secondary identification data being associated with the primary identification data which defines authorised movement of the secondary bearer; and comparing the secondary identification data and the primary identification data to monitor movement of the secondary bearer from the selected zone.

The method may include fixedly attaching the secondary electronic tag to an item of value thereby to monitor unauthorised removal of the item of value from the selected zone.

The method may include issuing the primary electronic tag to a person supervising at least one child;

issuing a secondary electronic tag to the child, the secondary electronic tag including unique identification data to identify the child and which is intermittently transmitted;

programming the primary electronic tag with the primary identification data and the secondary electronic tag with the secondary identification data; and generating an alarm signal when the child and the supervisor are not in the same zone.

A plurality of children may each be issued with a secondary electronic tag and the primary identification data includes an inventory of the secondary electronic tags with which it is associated.

The method may include controlling operation a security control arrangement in response to the comparison selectively to inhibit departure of the primary bearer from the zone.

Still further in accordance with the invention, there is provided a method of monitoring the use of at least one vehicle, the method including issuing a primary electronic tag including primary identification data to a person authorised to drive a particular vehicle;

providing the vehicle with a secondary electronic tag which includes secondary identification data associated with the primary identification data;

reading the primary and secondary identification data in a wireless fashion when the person occupies the vehicle; and comparing the primary and secondary identification data thereby to monitor use of the vehicle.

The method may include selectively disabling the vehicle in response to the comparison. For example, a conventional vehicle immobilising system may be activated.

The invention is now described, by way of example, with reference to the accompanying diagrammatic drawings.

Figure 1:
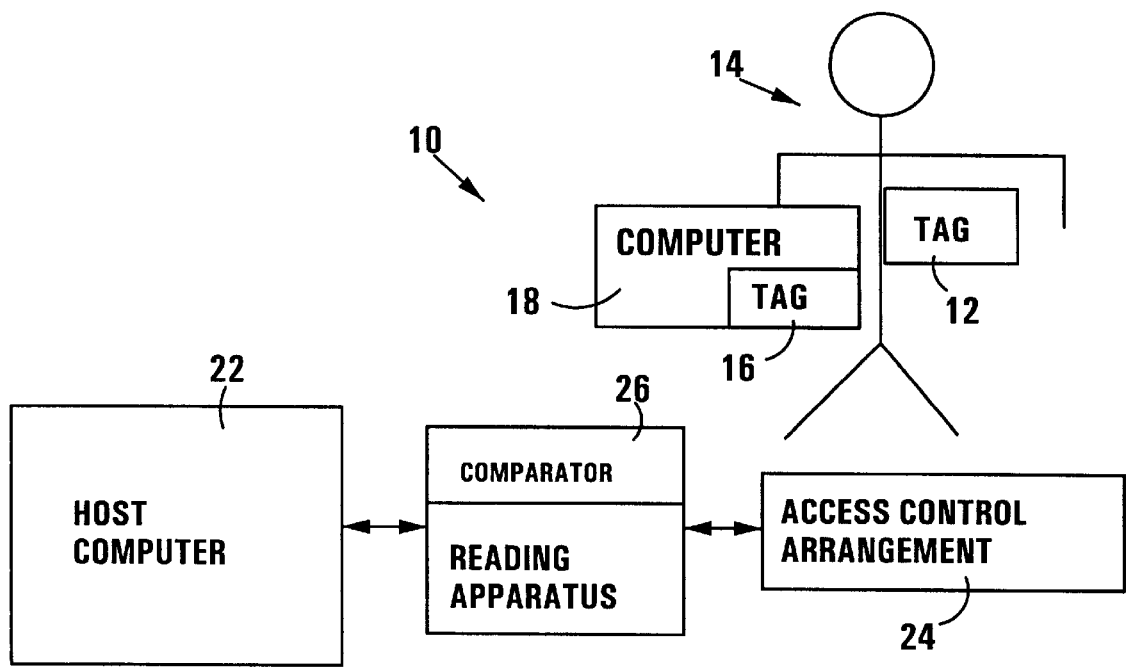
FIG. 1 shows a schematic diagram of an access control system in accordance with the invention.

Referring to the drawings, reference numeral 10 generally indicates a monitoring system in the form of an access control system in accordance with the invention. The system 10 includes a primary electronic tag 12 carried by an authorised primary bearer 14 of the tag 12, a secondary electronic tag 16 which is fixedly mounted to a secondary bearer in the form of an object such as a laptop computer 18, reading apparatus 20, an optional host computer 22, and an access control arrangement 24. The reading apparatus 20 includes a comparator 26 which is operable to compare selected data received from both the primary and secondary electronic tags 12, 16 and, in response to the comparison, allow or deny access of the bearer 14 to or from a selected zone, typically business premises or the like.

The primary electronic tag 14 is an active tag including its own power supply unit which typically includes a long-life lithium battery. The primary electronic tag 12 has storage means in which primary identification data is programmed. The data may be programmed remotely in a conventional wireless fashion into the primary electronic tag 12 or via hardwired connections. The primary identification data is uniquely associated with the authorised bearer 14 and includes details such as the name and other identification details of the authorised bearer 14. The primary electronic tag 12 intermittently transmits the primary identification data via an RF signal which is received by the reading apparatus 20 when the bearer 14 passes the access control point. In other embodiments of the invention, the primary electronic tag 12 is a transponder tag or the like which is interrogated in a conventional fashion.

The secondary electronic tag 16 is substantially similar to the primary electronic tag 12 and includes unique secondary identification data which identifies the laptop computer 18 to which it is attached. Preferably, the secondary electronic tag 16 is attached to the laptop computer 18 in such a fashion so that it is concealed and not easily removed from the laptop computer 18. Preferably, the secondary electronic tag 16 includes a tampering sensor or the like for sensing when a person of devious intent attempts to remove the secondary electronic tag 16 from the laptop computer 18. The secondary electronic tag 16 is also an active tag. It includes a long-life lithium battery and intermittently transmits the secondary identification data so that when it passes the access control point the reading apparatus 20 may receive the secondary identification data.

As mentioned above, the secondary identification data is uniquely associated with a particular object, namely the laptop computer 18, to which it is attached. However, the primary identification data of the primary electronic tag 12 includes data associated with a variety of different secondary electronic tags 16. Thus, the storage means of the primary electronic tag 12 may include a plurality of secondary identification data which defines a so-called called "asset list" or inventory defining various different assets to which various different secondary electronic tags 16 are attached. Each object or item which the authorised bearer 14 is authorised to remove or transport past the access control arrangement 24 is included in the asset list.

When the bearer 14 approaches the access control point, the reading apparatus 20 receives signals from both the primary and the secondary electronic tags 12, 16, and the primary and secondary identification data respectively included in the signals is fed into the comparator 26. If the secondary identification data matches the selected primary identification data, the comparator is operable to generate a control signal which is fed to the access control arrangement 24 to allow access of the bearer 14 to or from the selected zone as the case may be. However, if the bearer 14 is not authorised to remove the laptop computer 18 (or any other item which he or she may be carrying with its associated secondary electronic tag) from the selected zone, the comparator 26 will ascertain this when comparing selected primary and secondary identification data and, optionally, deny access to or from the selected zone by means of the access control arrangement 24. Thus, the primary electronic tag 12 defines a list of assets each of which are fitted with a secondary electronic tag 16 which the bearer 14 is authorised to remove from various zones, for example, business premises.

In certain embodiments of the invention, the reading apparatus 20 is connected to the host computer 22 which is operable to store selected information sourced from the primary and secondary electronic tags 12, 16. For example, the host computer 22 may store information from the primary electronic tag 12, such as the person to whom the primary electronic tag 12 was issued, and thereby monitor what assets are being removed from the selected zone or business premises by the bearer 14.

Figure 2:
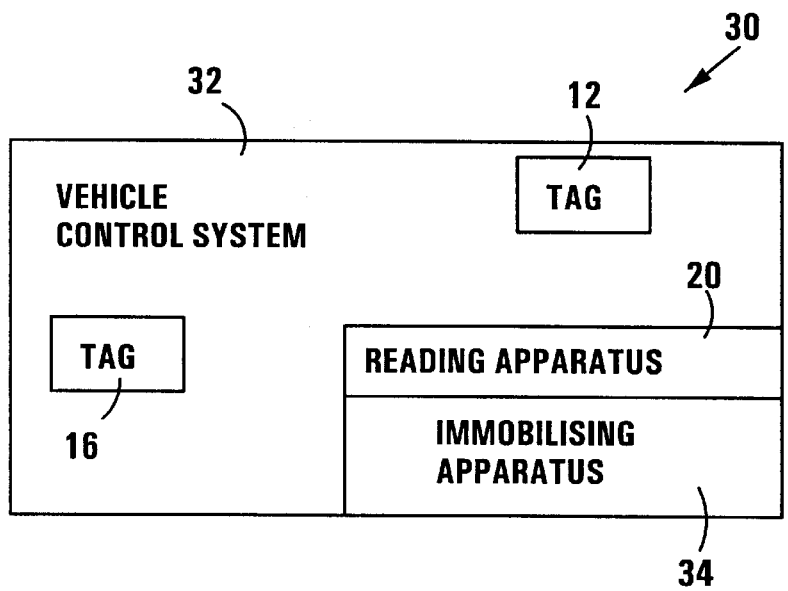
FIG. 2 shows a schematic diagram of a vehicle control system, also in accordance with the invention, for controlling use of a vehicle.
Figure 3:
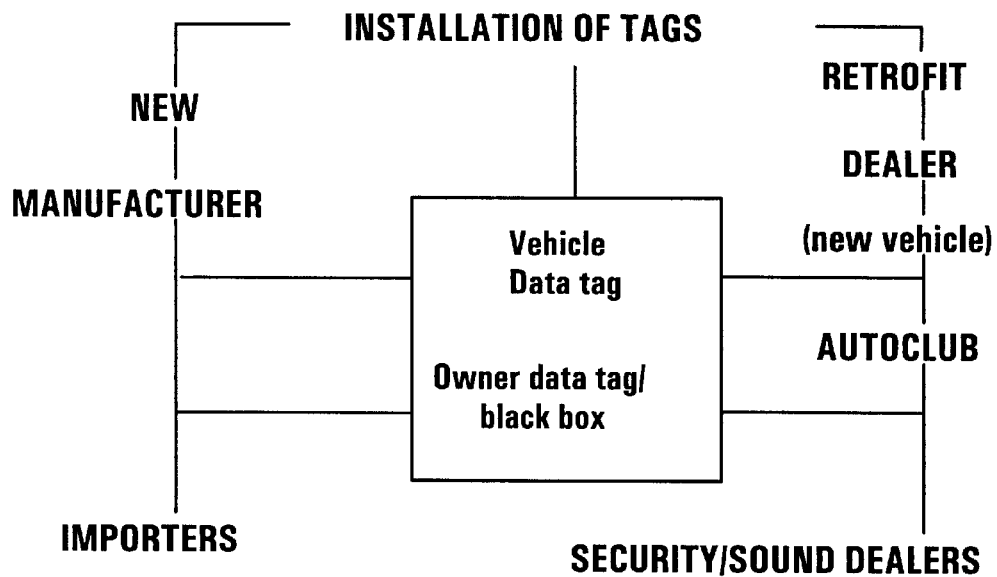
FIG. 3 shows a schematic diagram of installation of electronic tags for use in the vehicle control system of FIG. 2.
Figure 4:
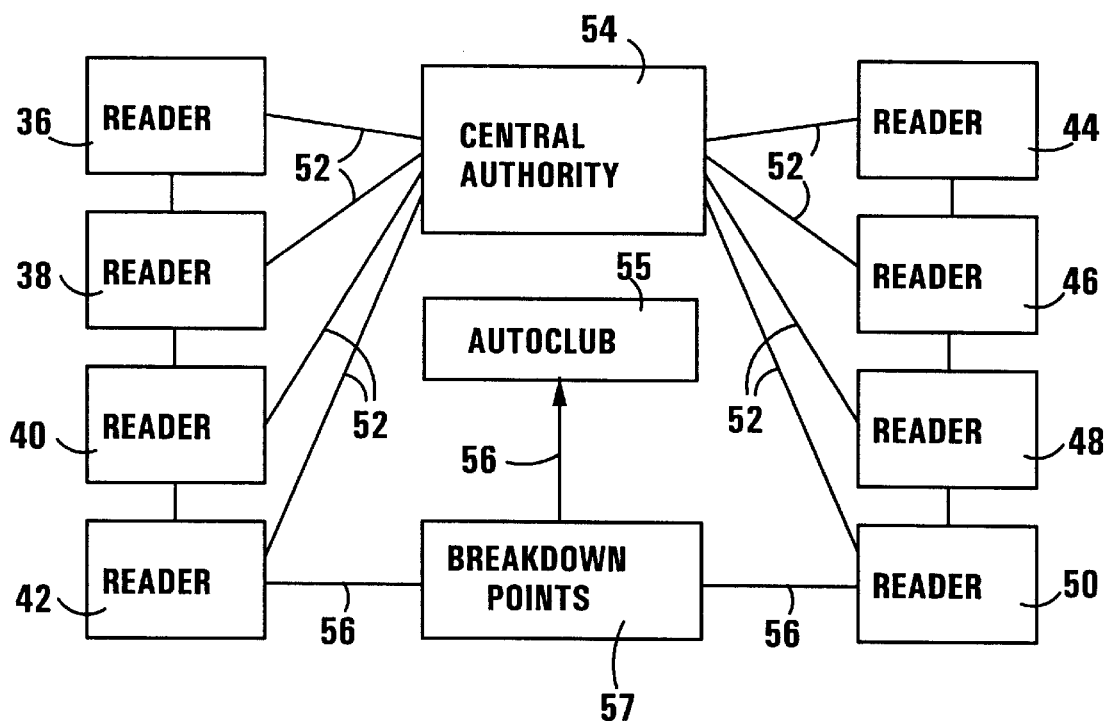
FIG. 4 shows a schematic block diagram of various optional installations of reading apparatus for reading the electronic tags of the control systems of FIG. 2.

Referring in particular to FIGS. 2 to 4 of the drawings, reference numeral 30 generally indicates a vehicle control system, also in accordance with the invention, for controlling the use of a vehicle 32. The control system 30 includes a secondary electronic tag 16, a primary electronic tag 12, and vehicle immobilising apparatus 34. The immobilising apparatus 34 includes reading apparatus 20 which is operable to read primary identification data and secondary identification data from the primary electronic tag 12 and the secondary electronic tag 16 respectively. The reading apparatus 20 includes a comparator which is operable to compare selected primary and secondary identification data and, in response thereto, activate or deactivate the immobilising apparatus 34. The immobilising apparatus 34 is typically connected to the vehicle power supply and may include its own rechargeable battery.

In a similar fashion as described above, the primary electronic tag 12 has storage means which includes the primary identification data which relates to and is associated with various secondary electronic tags 16 thus defining which vehicles the bearer of the primary electronic tag 12 is authorised to drive. Thus, in a similar fashion as described above, the data of the primary electronic tag 12 and the secondary electronic tag 16 is compared and, dependent upon the result of the comparison, the vehicle is either immobilised or activated. The secondary electronic tag 16 is typically inserted into a fuel tank of the vehicle either during manufacture of the vehicle or subsequently as shown in FIG. 3.

Referring in particular to FIG. 4 of the drawings, the reading apparatus 20 may include a plurality of readers which are located at selected locations, e.g. at various positions along toll roads 36, at border posts 38, at police stations 40, at vehicle recovery pounds 42, at access points to home or office parking 44, at service garages 46, at fuel sale garages 48, and in police and traffic vehicles 50. Typically, the readers 36 to 50 are connected via communication networks 52 to a central authority 54 which may then process the data and report on the location of, for example, hot listed stolen vehicles which are identified by their unique secondary electronic tag 16. Further readers may be provided at autoclub breakdown points 57 and linked to various other points via communication links 56, e.g. to a head office of an autoclub 55. The readers 36 to 50 in certain embodiments of the invention are fixed units which are fitted at the various points, and in other embodiments of the invention, they are hand-held readers.

The immobilising apparatus 34 may, dependent upon the comparison between selected primary identification data and secondary identification data, immobilise the vehicle immediately, immobilise the vehicle after a predetermined time delay, activate flashing lights, activate a hooter of the vehicle, or cut off the fuel or ignition lines of the vehicles. Typically, the immobilising apparatus 34 includes a microprocessor based controller which can store data such as the service history of the vehicle, its owner, its insurer, its financier, or the like. Thus, the immobilising apparatus 34 with its internal storage means may retain a complete history of the vehicle including driving parameters, odometer readings or the like. The primary identification data of the primary electronic tag 12 may typically include driver identification details, medical doctor details, next of kin details, AA number, insurance details or the like. Likewise, the secondary identification data of the secondary electronic tag 16 may include comprehensive details of the vehicle 32. In certain embodiments of the invention, the vehicle 32 would automatically be immobilised or activated when a driver bearing the primary electronic tag 12 climbs into or out of the vehicle 12.

In other embodiments of the invention, the primary electronic tag 12 may include details of a financial nature. Accordingly, the primary and secondary electronic tags 12, 16 may, for example, be used to verify credit transactions in which event the secondary electronic tag 16 may be included in a credit card or the like. In other embodiments the financial transactions may extend to invoicing of goods purchased. In other embodiments, the primary or secondary electronic tags 12, 16 may activate fuel dispensing pumps.

In yet further embodiments of the invention, the primary electronic tag 12 may be issued to a supervisor or parent supervising several children. Each child is then issued with a secondary electronic tag 16 which has attachment means for releasably attaching it to the child. The primary identification data then includes an "inventory" or list of the secondary identification data which identifies each child. For example, a plurality of reading apparatus may be located in a theme park, each reading apparatus monitoring a particular zone within the theme park. The reading apparatus then intermittently receive the primary and secondary identification data and monitor if all the secondary electronic tags 16 (and thus all the children) listed or identified in the primary identification data are within the same zone. If not, an alarm signal may be generated. In a similar fashion to the access control system 10, a secondary electronic tag 16 may be attached to a child to inhibit unauthorised removal of a child from a particular zone or area.

It is to be appreciated that the monitoring system including the primary electronic tags 12 with data on a plurality of secondary electronic tags 16 may be used in a large variety of different applications in which one or more supervisors monitor a plurality of people. For example, a tour guide may be issued with a primary electronic tag 12 which has data on a plurality of secondary electronic tags 16 issued to members of a tour group. The primary and secondary electronic tags 12, 16 may, for example, be monitored to ensure all the members have embarked on a bus after visiting a particular tourist attraction.

The Inventor believes that the invention, as illustrated, provided a relatively simple and cost effective electronic tag arrangement that may be used in a variety of different applications.

What is claimed is:

1. A monitoring system which includes
   a primary electronic tag including primary identification data and associated with a primary bearer of the tag;
   a secondary electronic tag including secondary identification data and associated with a secondary bearer of the tag, the secondary identification data being associated with the primary identification data;
   reading apparatus for remotely reading the primary identification data from the primary identification tag and remotely reading the secondary identification data from secondary identification tag; and
   comparator means operable to compare the secondary identification data and the primary identification data and generate an output signal dependent upon an outcome of the comparison.

2. A system as claimed in claim 1, which includes a plurality of secondary electronic tags associated with the primary electronic tag, each secondary electronic tag including secondary identification data which identifies the bearer to which it is attached and which is identified by the primary identification data.

3. A system as claimed in claim 2, in which the primary electronic tag includes primary attachment means configured releasably to attach it to the primary bearer which is in the form of a person and the secondary electronic tag includes secondary attachment means configured releasably to attach it to the secondary bearer which is also in the in the form a person.

4. A system as claimed in claim 3, in which the secondary identification data identifies a child under the supervision of the bearer of the primary electronic tag and the comparator generates an output signal in the form of an alarm signal when the primary and secondary electronic tags are not within a predetermined zone covered by the reading apparatus.

5. A system as claimed in claim 4, which includes a plurality of reading apparatus each covering a different predetermined zone forming part of a public area, the comparator being operable to process the primary identification data and verify that all secondary electronic tags identified by the primary identification data are located within the predetermined zone covered by associated reading apparatus failing which an output signal in the form of an alarm signal is generated.

6. A system as claimed in claim 1, in which the primary electronic tag is carried in use by a person and the secondary electronic tag includes secondary attachment means configured fixedly to attach it to the secondary bearer in the form an item of value.

7. A system as claimed in claim 6, in which the primary identification data includes an inventory of valuable items which the bearer is authorised to remove from a particular zone, each item including a secondary electronic tag which is identified by the primary identification data.

8. A system as claimed in claim 7, which includes alarm apparatus responsive to the output signal for generating an alarm signal when the bearer of the primary electronic tag is not authorised to remove the valuable item from the zone.

9. A system as claimed in claim 7, which includes a security control arrangement responsive to the control signal and operable selectively to inhibit departure of the person from the zone if the valuable item is not included in the inventory.

10. A system as claimed in claim 1, in which the primary electronic tag is issued in use to a person authorised to use at least one selected vehicle and the secondary electronic tag is uniquely associated with and attached in use to the selected vehicle, the output signal indicating if the person is authorised to use the vehicle.

11. A system as claimed in claim 10, which includes disabling means responsive to the output signal and connected in use to an electrical system of the vehicle and operable selectively to disable the vehicle.

12. A system as claimed in claim 1, in which the primary and secondary electronic tags are active tags including an RF transmitter for intermittently transmitting the identification data.

13. A system as claimed in claim 1, in which the primary and secondary electronic tags are programmed with the primary and secondary identification data in a wireless fashion.

14. A system as claimed in claim 1, in which at least the secondary electronic tag includes tamper detection means for detecting tampering with the tag.

15. A method of monitoring movement from a selected zone, the method including
   reading primary identification data from a primary electronic tag issued to a primary bearer of the primary electronic tag;
   reading secondary identification data from a secondary electronic tag associated with a secondary bearer of the secondary electronic tag, the secondary identification data being associated with the primary identification data which defines authorised movement of the secondary bearer; and
   comparing the secondary identification data and the primary identification data to monitor movement of the secondary bearer from the selected zone.

16. A method as claimed in claim 15, which includes fixedly attaching the secondary electronic tag to an item of value thereby to monitor unauthorised removal of the item of value from the selected zone.

17. A method as claimed in claim 15, which includes
   issuing the primary electronic tag to a person supervising at least one child;
   issuing a secondary electronic tag to the child, the secondary electronic tag including unique identification data to identify the child and which is intermittently transmitted;
   programming the primary electronic tag with the primary identification data and the secondary electronic tag with the secondary identification data; and
   generating an alarm signal when the child and the supervisor are not in the same zone.

18. A method as claimed in claim 17, in which a plurality of children are each issued with a secondary electronic tag and the primary identification data includes an inventory of the secondary electronic tags with which it is associated.

19. A method as claimed in claim 15, which includes controlling operation a security control arrangement in response to the comparison selectively to inhibit departure of the primary bearer from the zone.

20. A method of monitoring the use of at least one vehicle, the method including issuing a primary electronic tag including primary identification data to a person authorised to drive a particular vehicle;

providing the vehicle with a secondary electronic tag which includes secondary identification data associated with the primary identification data;

reading the primary and secondary identification data in a wireless fashion when the person occupies the vehicle; and comparing the primary and secondary identification data thereby to monitor use of the vehicle.

21. A method as claimed in claim 20, which includes selectively disabling the vehicle in response to the comparison.

* * * * *